Figure 1:
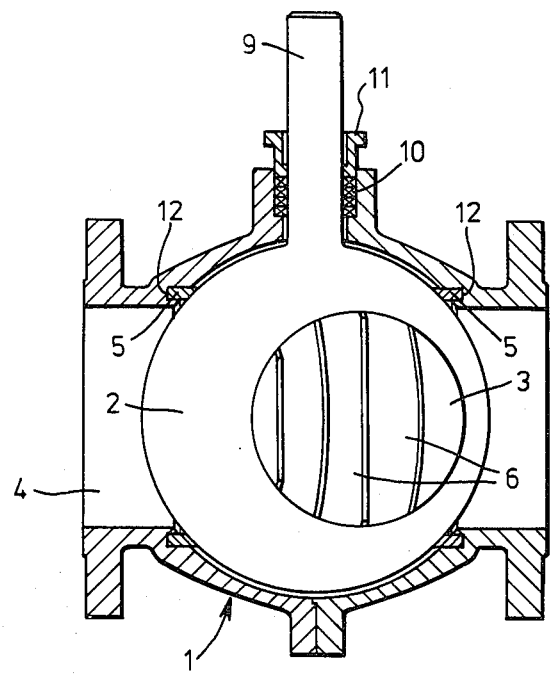

United States Patent [19]
Polon

[11] 4,364,415
[45] Dec. 21, 1982

[54] METHOD FOR ATTENUATING A MEDIUM FLOW PASSING THROUGH A VALVE AND A VALVE FOR APPLYING THE METHOD

[75] Inventor: Juhani Polon, Helsinki, Finland
[73] Assignee: Neles Oy, Helsinki, Finland
[21] Appl. No.: 179,567
[22] Filed: Aug. 19, 1980

[30] Foreign Application Priority Data
Jun. 27, 1980 [FI] Finland .................................. 802046

[51] Int. Cl.³ .......................... F16K 5/06; F16K 5/10
[52] U.S. Cl. ................................ 137/625.32; 251/127
[58] Field of Search ..................... 251/127; 137/625.32

[56] References Cited

U.S. PATENT DOCUMENTS

| | | | |
|---|---|---|---|
| 696,691 | 4/1902 | McCormack | 137/625.32 |
| 3,023,783 | 3/1962 | Vickery | 137/625.32 X |
| 3,826,281 | 7/1974 | Clark | 251/127 X |
| 3,974,860 | 8/1976 | Stead et al. | 137/625.32 X |
| 4,212,321 | 7/1980 | Hulsey | 251/127 X |

FOREIGN PATENT DOCUMENTS

| | | | |
|---|---|---|---|
| 1200688 | 11/1958 | Fed. Rep. of Germany | 251/127 |
| 1498325 | 4/1966 | France . | |
| 15914 | of 1905 | United Kingdom | 251/127 |

*Primary Examiner*—Arnold Rosenthal
*Attorney, Agent, or Firm*—Cushman, Darby & Cushman

[57] ABSTRACT

A method for attenuating a medium flow passing through a valve provided with a flow passage. Into the valve, a substantially ball-like or ball-segment shaped or conical or cylindrical plug-like closure member has been fitted turnably. The attenuating of the flow has been arranged as taking place in both flow directions mainly in the passage in the closure member or in a bore passing through the closure member. The attenuating effect is increased as the valve is being closed and the attenuating effect is correspondingly reduced as the closure member is being turned towards the open position. In the passage in the closure member or in the bore passing through the closure member, the length of the path of flow of the pressure medium is increased and the direction of the flow of the pressure medium is alternated. The more the valve is being closed, the longer becomes the path of flow of the pressure medium in the bore or passage in the closure member and, correspondingly, the higher becomes the number or changes in direction of the pressure medium flow within the range of the passage or bore in the closure member.

6 Claims, 4 Drawing Figures

METHOD FOR ATTENUATING A MEDIUM FLOW PASSING THROUGH A VALVE AND A VALVE FOR APPLYING THE METHOD

The subject of the present invention is a method for attenuating a medium flow passing through a valve provided with a flow passage, into which valve a substantially ball-like or ball-segment shaped or conical or cylindrical plug-like closure member has been fitted turnably, whereby the attenuating of the flow has been arranged as taking place in both flow directions mainly in the passage in the closure member or in a bore passing through the closure member so that tha attenuating effect is increased as the valve is being closed and the attenuating effect is correspondingly reduced as the closure member is being turned towards the open position.

The method in accordance with the invention is mainly characterized in that in the passage in the closure member or in the bore passing through the closure member, the length of the path of flow of the pressure medium in increased and the direction of the flow of the pressure medium is alternated so that the more the valve is being closed, the longer becomes the path of flow of the pressure medium in the bore or passage in the closure member and, correspondingly, the higher becomes the number of changes in direction of the pressure medium flow within the range of the passage or bore in the closure member.

The invention also includes a valve for applying the method mentioned above, and the features characteristic of the valve come out from claims 3 to 5.

Figure 2:
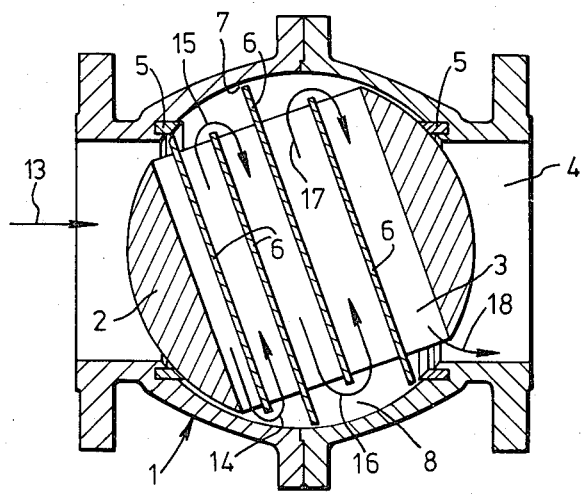
Figure 3:
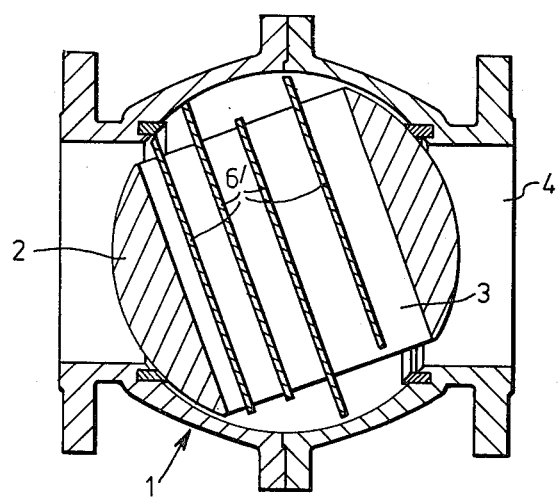
Figure 4:
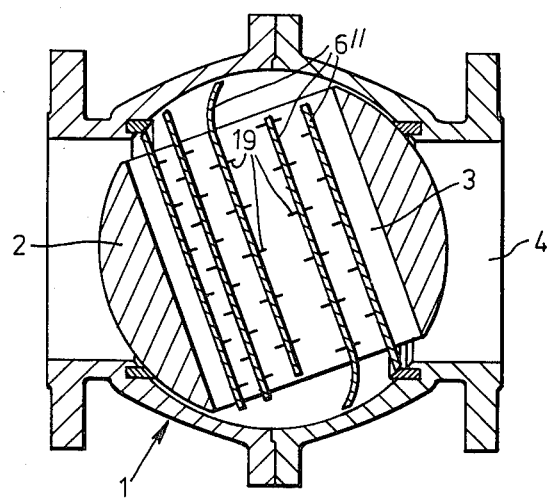

The invention comes out more closely from the following description and from the attached drawings, wherein FIG. 1 is a side view of a ball valve in accordance with the present invention with the valve body shown as a section in the longitudinal direction of the flow passage, FIG. 2 shows a longitudinal section of the valve shown in FIG. 1 at the middle of the flow passage as viewed in the direction of the stem, FIG. 3 shows a positioning of the attenuator plates alternative to the construction shown in FIG. 2, and FIG. 4 shows an embodiment alternative to the constructions shown in FIGS. 2 and 3.

The valve in accordance with FIGS. 1 and 2 comprises a valve body 1 and a valve closure member 2 fitter therein, which closure member is spherical and through which a bore or passage 3 extends which has the same cross-sectional area as that of the flow passage 4 for the medium placed in the valve body 1 at both sides of the closure member 2, the cross-sectional form of the said passage being circular. In FIGS. 1 and 2 the valve is in an almost closed position, whereby the bore or passage 3 is correspondingly almost transversal to the flow passage 4.

The closure member 2 is connected to a stem 9, which is of one piece with the closure member. The valve body 1 involves a seal construction for the passage of the stem 9, which seal construction comprises a so-called gland packing 10 and a gland 11. When the gland 11 is pressed into the body part of the seal structure by means of bolts or equivalent, the gland packing 10 placed around the stem 9 is pressed against the stem 9 and the body part.

At both sides of the closure member 2, annular recesses 12 have been made into the body 1 as transversal to the flow passage 4, into which recesses seat rings 5 have been fitted.

A device attenuating the medium flow passing through the valve in both directions has been fitted into the bore or passage 3 passing through the closure member 2, which device consists of a number of parallel attenuator plates 6 permanently fixed to the flow opening of the closure member 2 and placed at a distance from each other. Either one of the ends of the attenuator plates 6, whose faces are at least substantially whole, i.e. without apertures, or boreless, has been fitted as extending to the plane of the surface of the rotation pattern of the closure member 2 or to very close to the said surface of the rotation pattern in order to prevent flow between the body 1 and the plate 6 and 7, and the opposite ends of the plates 6 do not extend to the proximity of the surface of the rotation pattern, and a flow passage 8 of desired size is formed between the body 1 and the plate 6 for the flow of the pressure medium. In the valve in accordance with FIGS. 1 and 2 the ends of the attenuator plates 6 have been arranged so that they extend alternatingly at both ends of the flow passage 3 in the closure member 2 to the plane of the surface of the rotation pattern of the closure member 2 or very close to the said surface of the rotation pattern, and the opposite ends of the attenuator plates 6 concerned, correspondingly at both ends of the flow passage in the closure member, do not extend to the proximity of the plane of the surface of the rotation pattern of the closure member 2.

In the case shown in FIGS. 1 and 2, the valve is very slightly opened, whereby the pressure medium flow coming from the direction indicated by the arrow 13 must, as forced by the first attenuator plate in the direction of flow, flow in the passage between the wall of the flow passage 3 in the closure member 2 and the first attenuator plate 6, from where it flows further in the direction indicated by the arrow 14 between the first and the second attenuator plate 6, and so on along the flow path indicated by the arrows 15, 16, 17 and 18. When the closure member 2 is turned more open, the pressure medium no longer has to circulate back and forth around all the attenuator plates 6, but the flow can at least partly by-pass one or several attenuator plates 6. Thus in the passage in the closure member 2 or in the bore 3 passing through the closure member, the length of the flow path of the pressure medium is increased and the direction of the pressure medium flow is alternated so that the more the valve is closed, the longer becomes the flow path of the pressure medium in the bore or passage 3 in the closure member 2 and, correspondingly, the higher becomes the number of alternations of direction of the pressure medium flow within the range of the passage or bore 3 in the closure member 2.

In the valve shown in FIG. 3 the attenuator plates 6' have been placed in the flow passage 3 in the closure member 2 so that the first, the second, and the fourth attenuator plate 6' extend, as compared with each other, at the same ends of the plates to the proximity of the plane of the surface of the rotation pattern of the closure member 2 and, correspondingly, at the opposite ends of the plates do not extend to the proximity of the said surface of the rotation pattern. On the contrary, the third attenuator plate 6 is positioned so that it extends to the proximity of the plane of the surface of the rotation pattern of the closure member at the end of the flow passage 3 in the closure member 2 at which the other attenuator plates allow a flow passage to remain between the body 1 and the ends of the attenuator plates 6', and the opposite end of the said third attenuator plate 6' does not extend to the proximity of the said surface of the rotation pattern of the closure member 2.

In the valve shown in FIG. 4, the attenuator plates 6" have been positioned further in a way differing from the above, and additionally obstacle plates 19 transversal to the flow passage formed by the attenuator plates have been placed onto the surface of the attenuator plates 6", which obstacle plates have been placed alternately on opposite walls of the flow passage.

Moreover, in the embodiment shown in FIG. 4, two attenuator plates 6" in the middle have been made curved at their ends extending further so as to guide the streaming of the medium flow.

The attenuator plates 6, 6' and 6" are preferably placed in the way coming out from FIGS. 2 to 4 so that the plates are closer to each other at the inlet side of the pressure medium and more distant from each other at the outlet side so that the cross-sectional area of the longest flow path of the pressure medium passing through the closure member 2, i.e. of the flow path that is formed when the valve is only slightly open, increases in the direction of flow.

Of course, within the scope of the invention, the flow path in the flow passage in the closure member of the valve may also be shaped in a different way within the scope of the method as claimed in the main claim, besides by using parallel whole attenuator plates placed at a distance from each other.

What we claim is:

1. An attenuating valve assembly comprising: a valve body having a flow passage formed therethrough; a closure member, having means defining a through-extending bore therein; means for mounting said closure member in said valve body for rotation about an axis with respect to said valve body between a completely open position wherein said closure member allows passage of fluid therepast through said flow passage, and a completely closed position wherein said closure member blocks all flow through said flow passage; sealing means provided in said valve body flow passage for operatively engaging said closure member for preventing fluid flow through said flow passage past said closure member once the closure member is in said closed position; means for attenuating fluid flowing through said flow passage past said closure member, without significantly restricting flow once said closure member is in said completely open position, said attenuating means comprising a plurality of solid attenuator parallel plates; and means for mounting said attenuator plates with respect to said closure member so that as said closure member is being closed, the closer it comes to being closed the longer the flow path of fluid through the closure member becomes, and the more the closure is opened the shorter the flow path through the flow member becomes, said mounting means mounting said plates within said bore through said closure member so that each plate extends outwardly from said bore at one end thereof.

2. An assembly as recited in claims 1 wherein said closure member has a regular curved exterior surface, and wherein said solid plates extend outwardly from said bore to points substantially on a geometric extension of said curved exterior surface.

3. An assembly as recited in claim 1 or 2 wherein each of said plates extends outwardly from said bore a substantial distance only on one end of said bore, not the other end.

4. An assembly as recited in claim 3 wherein alternating ones of said plates extend outwardly from opposite ends of said bore.

5. An assembly as recited in claim 1 or 2 further comprising a plurality of obstacle plates disposed in association with said solid plates, each obstacle plate extending perpendicular to said solid plate and extending a distance from its respective solid plate less than the spacing between its solid plate and an adjacent solid plate.

6. An assembly as recited in claim 2 wherein the portion of a solid plate extending outwardly from said bore is curved with respect to an axis parallel to said axis of rotation of said closure member.

* * * * *